March 12, 1963     E. T. OAKES     3,081,069
MIXING APPARATUS
Filed Sept. 14, 1959
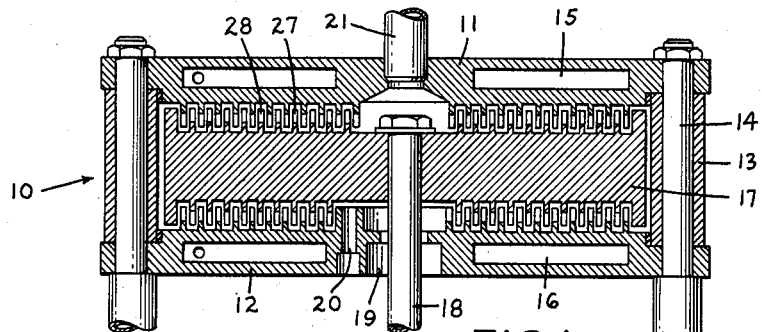
FIG.1.
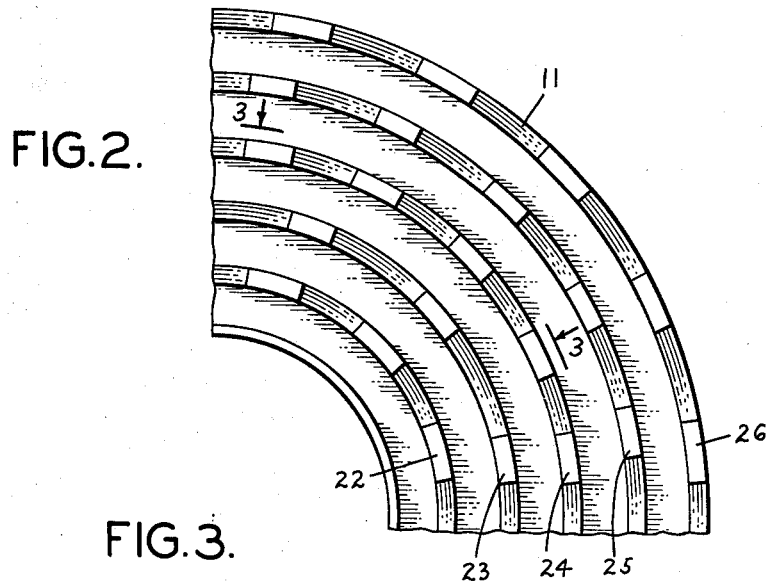
FIG.2.
FIG.3.
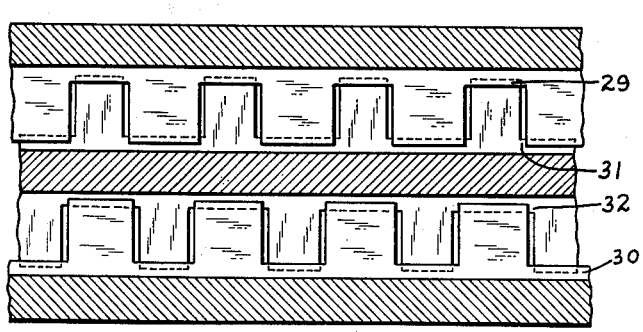
INVENTOR
EARLE THOMAS OAKES
BY
HIS ATTORNEYS United States Patent Office 3,081,069
Patented Mar. 12, 1963

3,081,069
MIXING APPARATUS
Earle Thomas Oakes, East Islip, N.Y., assignor to The E. T. Oakes Corporation, Islip, Long Island, N.Y., a corporation of New York
Filed Sept. 14, 1959, Ser. No. 839,913
2 Claims. (Cl. 259—8)

This invention relates to improvements in mixing apparatus, and it relates more particularly to a continuous mixer by means of which materials can be subjected to kneading, stirring and beating under normal or superatmospheric pressures to thereby assure a thorough mixing of the material introduced into the mixer.

Mixers of known types include a disc-like rotor having a plurality of concentric, annular rows of teeth on one or both faces thereof which extend between concentric, annular rows of fixed teeth so that the ingredients introduced into the mixer follow a tortuous path around and between the fixed and moving teeth and thereby are subjected to intensive stirring, kneading and beating. In these prior mixers, the outer ends of the teeth on the rotor are spaced a short distance from the stator or stators which carry the fixed teeth while the outer ends of the teeth on the stator or stators are spaced a short distance from the surface of the rotor in order to provide flow passages for the material around the rows of teeth. When kneading some kinds of material, some of the material adjacent the rotor tends to flow radially through the spaces between the rotor and the ends of the teeth on the stator or stators. It also flows radially through the spaces between the ends of the teeth on the rotor and the stator or stators. This material is not as thoroughly mixed and agitated as the material which passes through and between the teeth.

In accordance with the present invention, the teeth of the stator and rotor are modified in such a manner that flow of the material along the face of the rotor and the stator or stators is prevented and the material adjacent thereto is deflected outwardly between the teeth of the stator or stators and rotor so that all of the material passing through the mixing apparatus is subjected to a uniform mixing, kneading and stirring operation.

More particularly in accordance with the present invention, thin webs are provided between the bases or inner ends of the teeth of the rotor, the webs in each row forming with the teeth a continuous rim or flange which overlaps the outer ends of the teeth on the stator or stators. Similar webs are interposed between the teeth on the stator or stators in such a way as to provide a continuous rim or flange which overlaps the ends of the teeth on the rotor. In this way, material is deflected outwardly by the webs into contact with the teeth of opposing rows and no unobstructed path of flow is present in the mixing device through which the material may flow without striking the mixing teeth.

For a better understanding of the present invention, reference may be had to the accompanying drawing, in which:

FIGURE 1 is a view in cross section through a typical mixing device embodying the present invention;

FIGURE 2 is a plan view of a portion of one of the stators of the mixing apparatus, illustrating the formation of the teeth thereon; and FIGURE 3 is a view in section taken on line 3—3 through a portion of the stators and rotors of a typical mixing apparatus.

As illustrated in FIGURE 1, the mixer 10 includes a pair of end plates or stators 11 and 12 which are disposed on opposite sides of an annular ring 13 and secured thereto in leak-tight relation by means of clamping bolts 14. The end plates 11 and 12, if desired, may be provided with passages 15 and 16 through which hot or cold fluids may be circulated in order to heat or cool the material undergoing mixing in the apparatus.

Interposed between the end plates 11 and 12 is a rotor member 17 which may be suitably supported on a shaft 18 journaled in bearings exterior of the mixer casing. Materials to be mixed can be introduced through a central passage 19 around the drive shaft 18 and a gas, such as air, or other material may also be introduced through the passage 20 adjacent to the center of the end plate 12. The mixed material is discharged through a discharge pipe 21 located centrally of the end plate 11 and communicating with the interior of the mixing chamber. The discharge pipe can be throttled to enable the mixer to be maintained under superatmospheric pressure, if desired.

As best shown in FIGURES 1 and 2, each of the end plates 11 and 12 is provided with a plurality of rows 22, 23, 24, 25, 26, etc., of teeth which are disposed in angularly, spaced-apart relation in the rows. Likewise, the rotor 17 is provided with annular rows 27, 28, etc. of spaced-apart teeth on opposite sides thereof in such relation that they extend between the rows of teeth on the two end plates 11 and 12. With this arrangement, when the shaft 18 is rotated to drive the rotor 17, flowable materials introduced through the passages 19 and 20 follow tortuous paths between the rows of teeth and through the spaces between the teeth so that the material is subjected to a kneading, beating and stirring action, the intensity of which can be controlled by controlling the speed of rotation of the rotor 17. As illustrated in FIGURE 1, spaces remain between the outer ends of the teeth on the rotor and inner surfaces of the end plates 10 and 12 and likewise, between the inner ends of the teeth on the end plates 11 and 12 and the outer surfaces of the rotor 17.

In accordance with the present invention, means is provided for preventing radial flow of materials between the teeth and along the surfaces of the rotor and end plates or stators by providing relatively low or shallow webs 29 and 30 between the teeth on the stators and similar low webs 31 and 32 between the bases of the teeth on the rotor. The webs 29 to 32 are high enough to overlap the ends of the teeth on the opposing member (stator or rotor) adjacent thereto. In this way, material which otherwise might ends to flow adjacent to the surfaces of the end plates and the opposing surfaces of the rotor is deflected outwardly therefrom by the webs into engagement with the teeth of the rotor or stator(s) and agitated thereby.

It should be understood that not all of the rows of teeth on the stator and rotor need be provided with webs 29 to 32 therebetween and, in fact, in many instances, only one or two rows on each stator and each side of the rotor may be provided with such webs. However, where the webs are present, they will divert the material away from the adjacent face of the rotor or stator as the case may be, and direct it into engagement with the mixing teeth to enhance the mixing operation. The webs can be formed by providing the end plates and the rotor with annular, concentric flanges, and then milling out parts of the flanges to form the teeth, the milling operation being terminated short of the base of the flanges to thereby leave the webs between the bases of the teeth.

While the mixing apparatus illustrated herein includes an annular ring 13 between the end plates 11 and 12, it will be understood that the ring can be omitted and the end plates suitably formed so that they can be detachably secured together in liquid and gas-tight relation. Moreover, for some purposes, only one end plate or stator of the mixing head may be provided with annular rows of teeth and only one surface of the rotor is provided with overlapping rows of teeth. Accordingly, the form of the invention disclosed herein should be considered as illustrative and not as limiting the scope of the following claims.

I claim:

1. A mixing apparatus comprising a stator and a rotor disposed in face to face but spaced-apart relation and the rotor mounted for rotation about an axis normal to the adjacent faces of said stator and rotor, said stator having a plurality of circular rows of teeth concentric with said axis and extending towards but not entirely to said rotor, with the teeth in each row spaced apart in the row, said rotor also having a plurality of circular rows of teeth concentric with said axis and extending towards but not entirely to said stator, with the teeth on said rotor spaced apart in each row, each row of teeth on said stator being disposed between and radially spaced from two adjacent rows of teeth of said rotor, adjacent teeth of both stator and rotor being connected at their bases by webs and the free ends of the teeth of the stator overlapping in a direction parallel to said axis with the webs between the teeth of the rotor, and the free ends of the teeth of the rotor overlapping in a direction parallel to said axis with the webs between the teeth of the stator, and means for feeding material to be mixed to the space between the stator and rotor at one concentric row and removing it from between them at another concentric row remote from said one concentric row.

2. A mixing apparatus comprising a casing having spaced-apart, opposed end plates, a disc-like rotor rotatably mounted in said casing between said end plates, a plurality of spaced, annular flanges on said rotor coaxial with the axis of rotation of said rotor and extending toward at least one of said end plates, said flanges having free edges adjacent to said one end plate, a plurality of concentric, spaced-apart annular flanges fixed to said one end plate and extending toward said rotor between the flanges on said rotor and having free edges adjacent to said rotor, a plurality of said annular flanges on said rotor and said one end plate having notches in their free edges forming annular rows of spaced-apart teeth therein, the notches in at least two adjacent flanges on said rotor and in at least one flange on the said one end plate extending between said two adjacent flanges being shallower than the height of said flanges to form webs between said teeth in said one flange and in said two adjacent flanges, said webs in said one flange on said end plate overlapping the outer ends of said teeth in said two adjacent flanges on said rotor and said webs in said two adjacent flanges of said rotor overlapping the outer ends of the teeth in said one flange.

References Cited in the file of this patent
UNITED STATES PATENTS

| | | |
|---|---|---|
| 2,572,049 | Oakes | Oct. 23, 1951 |
| 2,627,394 | Spencer | Feb. 3, 1953 |
| 2,649,287 | McChesney | Aug. 18, 1953 |